VAN ORMER & BELL.
Balancing Millstones.
No. 35,187. Patented May 6, 1862.
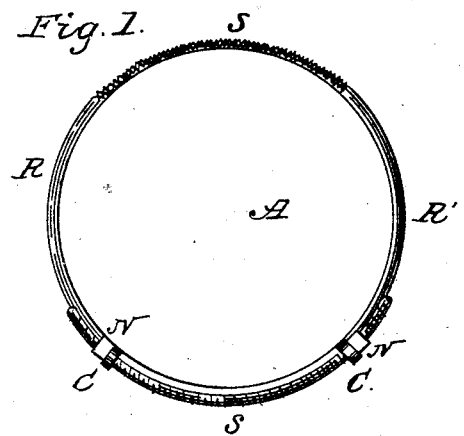
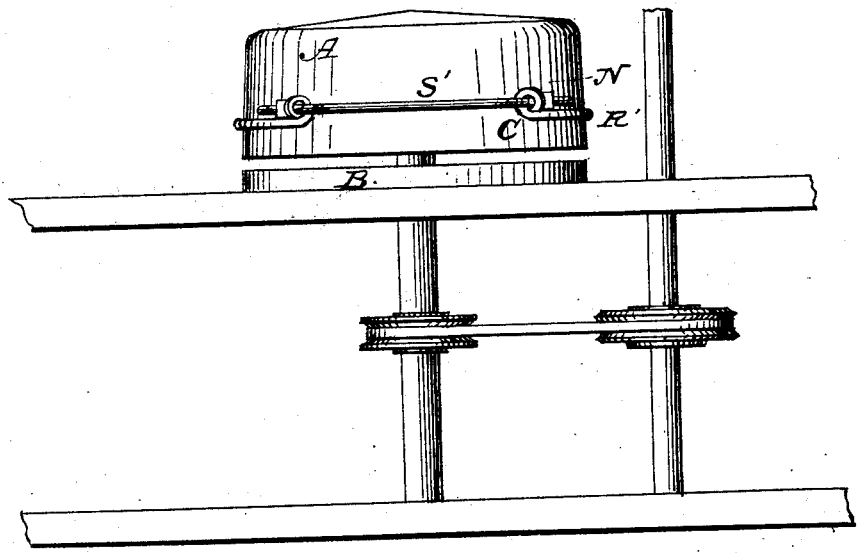

UNITED STATES PATENT OFFICE.

ROBERT VAN ORMER AND WILLIAM J. BELL, OF McALLISTERVILLE, PENNSYLVANIA.

IMPROVEMENT IN BALANCING MILLSTONES.

Specification forming part of Letters Patent No. 35,187, dated May 6, 1862.

*To all whom it may concern:*

Be it known that we, ROBERT VAN ORMER and WILLIAM J. BELL, both of McAllisterville, in the county of Juniata and State of Pennsylvania, have invented an Improved Device for Balancing Millstones; and we do hereby declare the following to be a correct description of the same, reference being had to the accompanying drawings, in which—

Figure 1 is a top view or plan of our improved balance, and Fig. 2 is a side elevation of a pair of millstones with our balance applied to the runner.

The nature of our improvement consists in providing a more ready mode of adjusting with accuracy the position of the weight by placing a spring on one side of the circle of which it is composed and on the other an adjusting-screw controlled by nuts, as hereinafter more particularly described and shown.

The object of balancing the runner is to preserve its parallelism with the bed-stone and thus insure regularity and evenness of grinding. The difficulty of effecting and maintaining a perfect balance arises from the fact that the same weight which would balance the stone while at rest does not necessarily effect that object when it is in revolution. Moreover, the wear of the stone and of its supports is constantly changing its balance, which necessitates frequent adjustments. Our invention facilitates these adjustments.

In the drawings, A marks the "runner," and B the bed-stone. The balancing-weight we make of rods of iron R R', united on one side by the spiral spring S and on the other by the screw S', working in the threaded collars C and controlled by the nuts N. The whole forms a circular band, of which one side is heavier than the other, the spiral spring forming the lightest portion of the circle. This band is placed on the runner in the position shown in Fig. 2, the spring S being placed on the heavy side of the stone and the screw S' on the light side. By turning the nuts N the rods R R' can be adjusted in their position on the stone till a perfect balance is effected.

Having thus fully described our invention, what we claim, and desire to secure by Letters Patent, is—

The combination of the rods R R', spring S, and screw S', in the manner and for the purpose shown and described.

The above specification signed and witnessed this 15th day of March, A. D. 1862.

ROBERT VAN ORMER.
        WM. J. BELL.

Witnesses:
    A. I. FISHER,
    J. D. LONGACRE.